US011072966B1

(12) United States Patent
Eubanks et al.

(10) Patent No.: US 11,072,966 B1
(45) Date of Patent: Jul. 27, 2021

(54) VIDEO ANALYTIC ENHANCED PET DOOR

(71) Applicant: ObjectVideo Labs, LLC, Tysons, VA (US)

(72) Inventors: Dana Eubanks, Tysons, VA (US); Allison Beach, Leesburg, VA (US); Donald Madden, Columbia, MD (US)

(73) Assignee: Objectvideo Labs, LLC, Tysons, VA (US)

( * ) Notice: Subject to any disclaimer, the term of this patent is extended or adjusted under 35 U.S.C. 154(b) by 319 days.

(21) Appl. No.: 16/113,282

(22) Filed: Aug. 27, 2018

Related U.S. Application Data

(60) Provisional application No. 62/550,157, filed on Aug. 25, 2017.

(51) Int. Cl.

| E05F 15/73 | (2015.01) |
| A01K 29/00 | (2006.01) |
| G06K 9/00 | (2006.01) |
| G06K 9/62 | (2006.01) |
| G06T 7/62 | (2017.01) |

(52) U.S. Cl.
CPC ............ *E05F 15/73* (2015.01); *A01K 29/005* (2013.01); *G06K 9/00362* (2013.01); *G06K 9/6201* (2013.01); *E05F 2015/767* (2015.01); *G06K 9/6267* (2013.01); *G06T 7/62* (2017.01); *G06T 2207/10016* (2013.01); *G06T 2207/20081* (2013.01)

(58) Field of Classification Search
CPC ... E05F 15/73; A01K 29/005; G06K 9/00362; G06K 9/6201
See application file for complete search history.

(56) References Cited

U.S. PATENT DOCUMENTS

| 6,560,926 | B1 | 5/2003 | Gillett |
| 7,447,334 | B1 | 11/2008 | Jiang et al. |
| 10,438,465 | B1 * | 10/2019 | Bart .................. G06K 9/00335 |
| 2003/0221631 | A1 | 12/2003 | Yarbrough |
| 2008/0278335 | A1 | 11/2008 | Welte |
| 2013/0170696 | A1 * | 7/2013 | Zhu ........................ G06K 9/68 382/103 |
| 2015/0002732 | A1 * | 1/2015 | Hjelmstrom ......... H04N 5/2353 348/362 |
| 2016/0086403 | A1 * | 3/2016 | Litterer .................. A01K 29/00 340/5.7 |
| 2016/0239723 | A1 * | 8/2016 | Ge .................... G08B 13/19615 |
| 2017/0273277 | A1 * | 9/2017 | Monk .................... A01K 5/025 |

* cited by examiner

*Primary Examiner* — Nabil H Syed (74) *Attorney, Agent, or Firm* — Fish & Richardson P.C.

(57) ABSTRACT

Methods, systems, and apparatus, including computer programs encoded on a computer storage medium, for monitoring system with a video analytic enhanced pet door. The methods, systems, and apparatus include actions of obtaining video from a camera, determining from the video that an object is approaching the camera, in response to determining from the video that an object is approaching the camera, determining whether the object is an animal, in response to determining that the object is an animal, determining from the video whether the animal is authorized to enter a home, and in response to determining from the video that the animal is authorized to enter the home, opening a pet door.

17 Claims, 4 Drawing Sheets

VIDEO ANALYTIC ENHANCED PET DOOR

CROSS REFERENCE TO RELATED APPLICATIONS

This application claims benefit of U.S. Provisional Application No. 62/550,157, filed on Aug. 25, 2017, titled "VIDEO ANALYTIC ENHANCED PET DOOR," which is incorporated by reference in its entirety.

TECHNICAL FIELD

This disclosure relates to property monitoring technology.

BACKGROUND

Many people keep pets at home and permit their pets to leave and enter the home through a pet door.

SUMMARY

Techniques are described for monitoring technology with a video analytic enhanced pet door.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Pets are an important part of many people's lives. People may value and care for pets as they would any other member of the family so when trouble happens they may want their pets to be safe. Home owners may install pet doors in their homes so that when they are away from home all their pets may be more comfortable by having the freedom to go outside and back inside. A pet door may allow a pet to come and go from a climate-controlled home to a fenced-in yard as needed. A pet door may also allow a pet to access food or water inside the home, avoiding the risk of attracting bugs and unwanted critters to outside dishes. A pet door may also allow a pet to escape the home in case of danger, such as a gas leak or fire.

However, as with many things, sometimes the negatives outweigh the benefits. Pet doors may also allow unwanted animals (someone else's dog or cat, snakes, raccoons, or even bears) to enter a home in search of food or warmth. Larger pet doors can also be an access point for burglars. In order to be energy conscientious and safe at night, many people close their pet doors at nightfall. However, many house fires often occur at night. A sealed pet door may cause a pet to be trapped in a house.

A video analytic enhanced pet door may provide for various advantages of pet doors while reducing various disadvantages of pet doors. For example, a video analytic enhanced pet door may use video analytics to determine when to open so that pets may have the freedom to safely come and go from the home as they please while at the same time keep unwanted animals from entering the home.

Figure 1:
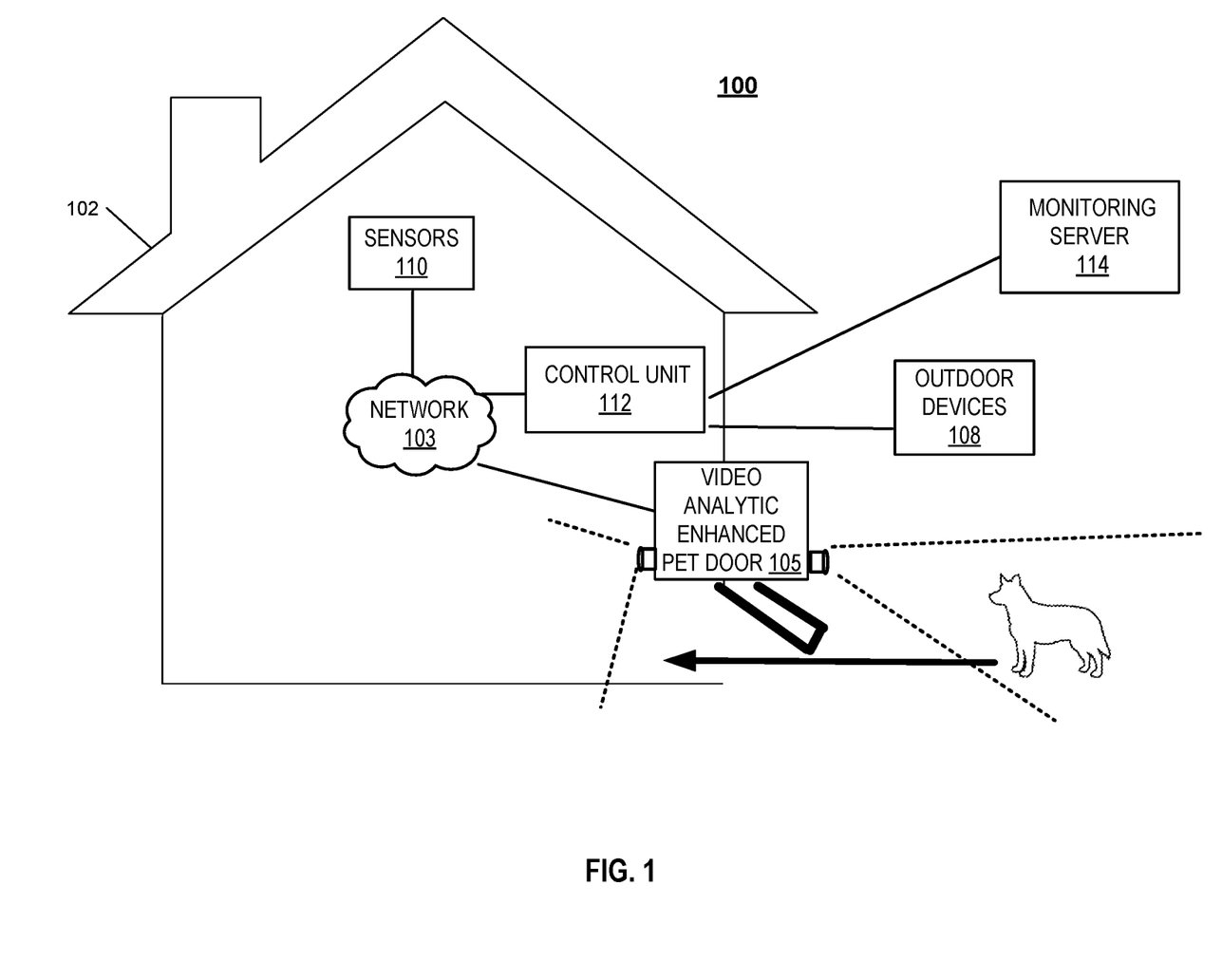
FIG. 1 illustrates an example of a monitoring system with a video analytic enhanced pet door.

FIG. 1 illustrates an example of a monitoring system 100 with a video analytic enhanced pet door 105. As shown in FIG. 1, a property 102 (e.g. a home) of a user is monitored by an in-home monitoring system (e.g. in-home security system) that includes components that are fixed within the property 102 (components both indoors and outdoors). The monitoring system 100 may include a control unit 112, one or more sensors 110, the pet door 105, one or more outdoor devices 108, and a monitoring server 114.

The video analytic enhanced pet door 105 may include a physical door, an electromagnetic actuator, two cameras, and a processor. The pet door 105 may be installed in a front door of a home, in a wall of a home, or some other boundary between the outside and inside of a home. The physical door of the pet door 105 may block an opening so that while the pet door 105 is closed, the physical door blocks an opening and when the pet door 105 is opened, the physical door no longer blocks an opening. For example, the physical door of the pet door 105 may swing open away from the front door or inwards when the pet door 105 changes from closed to open.

The electromagnetic actuator may move the physical door between an open and a closed position. For example, the pet door 105 may apply an electric current to the electromagnetic actuator to move the door to block an opening and may apply an opposite electric current to the electromagnetic actuator to block an opening. The electromagnetic actuator may be an electric motor, a solenoid, or some other type of actuator. In some implementations, the electromagnetic actuator may lock the physical door in place so that the physical door may not be physically manipulated to open or close the physical door. For example, the electromagnetic actuator may continue to keep the physical door closed so that an animal pushing against the physical door cannot overcome the force of the electromagnetic actuator pushing the physical door closed.

In some implementations, instead of the pet door 105 moving the physical door to block an opening or provide access to an opening, the pet door 105 may instead actuate a physical mechanism that locks the physical door in place or allows the physical door to be moved inward or outwards. For example, the electromagnetic actuator may move a deadbolt into a position that physically locks the physical door in place so that even if the electromagnetic actuator stops actively applying force to the deadbolt, the physical door may not be moved when physical force is applied to the physical door until the electromagnetic actuator moves the deadbolt to unlock the physical door.

The cameras may include a first camera that is on part of the pet door 105 that is facing the outside of a home and a second camera that is on part of the pet door 105 that is facing the inside of the home. For example, the first camera may show a field of view from a perspective of the pet door 105 facing outside and the second camera may show a field of view from a perspective of the pet door 105 facing inside.

The processor may receive video from the first camera and analyze the video to determine when to cause the electromagnetic actuator to open and close the physical door. For example, the processor may receive a video of a dog approaching the pet door 105 and, in response, send an electric charge to the electromagnetic actuator that causes the pet door 105 to open. In another example, the processor may receive a video of a dog moving away from the pet door 105 and, in response, send an electric charge to the electromagnetic actuator that cases the pet door 105 to close.

In a more detailed example implementation, the processor of the pet door 105 may use video analytics to detect and track moving objects within the field of view of the first camera facing outside the home. For example, the processor may determine that an object is moving in the video based on determining that as time passes, a shape in the video is changing in size or location.

In response to detecting a moving object, the processor may track the object to determine whether the object is approaching the pet door 105. For example, the processor may determine that the object is getting larger and, in response, determine that the object is approaching the pet door 105. In another example, the processor may determine that the object is getting smaller or that the object is staying the same size and, in response, determine that the object is not approaching the pet door 105. In some implementations, the processor may infer where an object is to estimate a distance from the camera or use a trained neural network to determine if the object is approaching or not.

In response to determining that the object is approaching the door, the processor may determine whether the object is an animal. For example, the processor may determine whether the changes in the shape of the object in the video corresponds with movement behavior, shape, size, color and other identifying characteristic expected for an animal. In some implementations, the processor may also consider a human an animal. In determining whether the object is an animal, the processor may use a classifier that is a neural network trained to recognize animals.

In response to determining that the object is an animal, the processor may identify the object as a particular type of animal. For example, the processor may determine whether the object is a dog, a cat, some other type of pet, a human, or some other type of animal that is wildlife and not a pet. In identifying the object is a particular type of animal, the processor may use a deep classifier that is a neural network trained to classify objects as different types of animals.

In response to determining that the object is a particular type of animal that is to be let through the pet door 105, e.g., a dog, the processor may determine whether the animal of the particular type is an authorized animal. For example, the processor may have stored in advance multiple images of a dog that lives in the home and the processor may determine whether a dog in a video is the dog that lives in the home based on comparing the dog in the video with one or more of the multiple images of the dog that lives in the home.

In response to determining that the object is an authorized animal, the processor may open the pet door 105. For example, in response to determining that the dog approaching the door is the dog that lives in the home, the processor may open the pet door 105. In some implementations, the processor may further determine whether there are additional other animals or people in a field of view as part of determining whether to open the pet door 105. For example, if the processor determines that there is another dog closer to the pet door 105 that is not an authorized animal, then the pet door 105 may not open. In another example, if the processor determines that a human that does not live in the home is within one, two, four feet or some other distance, to the authorized animal, then the processor similarly may determine not to open the pet door 105.

In some implementations, the processor may use this multi-step approach as each step may be more and more power intensive or computationally expensive so the approach may reduce the use of power or computation. For example, the identification of an animal as an authorized animal may be much more computationally expensive than determining whether an object is moving in a video. In some implementations, fewer or additional steps may be included in the approach. For example, the processor may skip a separate determination of whether an object approaching the pet door 105 is an animal. In the example, instead, the processor may determine that an object is approaching the door and, in response, attempt to classify the approaching object as a particular type of animal.

In some implementations, the process may determine not to analyze video of the outside of the home from the first camera to determine whether to open the pet door 105. For example, the processor may determine that only a single authorized animal resides in the home and the authorized animal is already indoors so may not perform any analysis on images from the first camera to determine whether to open the pet door 105 since an authorized animal could not possibly be approaching the pet door 105 from the outside.

In some implementations, the pet door 105 may also operate in a supervised mode. In the supervised mode the pet door 105 may require that a user manually approve that the pet door 105 open. For example, in response to determining that an authorized animal is approaching the pet door 105, the pet door 105 may send an indication to the control unit 112 of the home, the control unit 112 may then send an indication to the monitoring server 114, and the monitoring server 114 may then send an indication to a mobile computing device, e.g., a smartphone, of a user. The mobile computing device may then output a notification to the user so that the user can interact with the notification to view the video for the first camera and provide input on the mobile computing device indicating whether to open the pet door 105 or keep the pet door 105 closed.

In some implementations, the processor may operate in a mixed supervised mode. For example, if the processor determines that the approaching animal is a dog but is unable to determine that the dog is an authorized animal, e.g., it is dark or the dog is very dirty, the processor may cause an indication to be sent to the user so that the user can view the video and determine whether to open the pet door 105. In another example, if the processor determines that the approaching animal is the authorized animal but a human is next to the authorized animal, the processor may similarly cause an indication to be sent to the user to confirm whether to open the pet door 105.

In some implementations, the processor may close the pet door after a predetermined amount of time after opening the pet door. For example, the processor may close the pet door one, two, or five seconds after the authorized animal has passed through the pet door 105. In another example, the processor may close the pet door immediately after detecting the authorized animal has completely passed through the pet door 105. The processor may determine that the authorized animal has completely passed through the pet door 105 based on determining that video from the second camera facing the inside of the house is showing the entire authorized animal.

In some implementations, the processor may similarly determine to open the pet door 105 based on analyzing video from the second camera facing the inside of the home. In some implementations, the processor may use the same approach as with video from the first camera, perhaps to prevent a young child or toddler from accidently exiting. However, if there are no concerns with young children, and as there is no need to prevent wildlife or intruders from leaving the house to go outside of the house, the processor may use a simplified approach on the video from the second camera. For example, the processor may detect whether an object is moving in the video from the second camera. In response to determining that an object is moving in the video from the second camera, the processor may determine whether the object is approaching the door. In response to determining that the object is approaching the door, the processor may open the pet door 105 if in an unsupervised mode and, if in a supervised mode, the processor may provide an indication and then a stream of video from the second camera to a mobile computing device of a user so that the user can confirm whether to open the pet door 105, similarly to as described above for the first camera.

In some implementations, the processor may allow the pet door 105 to open for a pet to leave a home according to a pre-designated time schedule. For example, a user may designate a pet may only leave the house during 10 AM-3 PM so if the pet approaches the pet door 105 from inside the home at any other time, the pet door 105 may not open. In this example, the processor may perform no video analysis on video from the inside of the home and/or when in the supervised mode no indication may be sent to the user outside of the pre-designated times. In some implementations, the pet door 105 may include a physical hardware switch or a software switch that a user may toggle to switch pet door 105 between a mode where the pet door 105 analyzes video to determine whether to open and a mode where the pet door 105 does not analyze video to determine whether to open.

In some implementations, the processor may also allow the pet door 105 to open in other circumstances. For example, the processor may determine that video from the first camera (or from other cameras on the premises) from outside indicates an unfamiliar animal or person is outside near the home and, in response, not allow the pet door to open. In another example, the processor may determine that a gate of a fence around a home is open and, in response, determine not to open the pet door 105. In yet another example, the processor may determine that there is a thunderstorm or that it rained so it is wet outside and, in response, determine not to open the pet door 105. In still another example, the processor may determine that the linked hardware like an invisible fence is not functioning properly and, in response, determine not to open the pet door 105.

In some implementations, the processor may allow the pet door 105 to open when the pet approaches or may keep the pet door 105 open in response to detecting an emergency. For example, the processor may determine that there is a fire, a water leak, high concentrations of carbon monoxide, or some other emergency condition in the home through the sensors 110 in the home and, in response, allow the pet door 105 to open when the pet approaches or keep the pet door 105 open so that the pet can escape. In some implementations, the pet door 105 may receive the indications of emergency from the control unit 112 in the home. In some implementations, in response to detecting an emergency the pet door 105 or another component of a home monitoring system may emit an audible cue to notify the pet that the door is open and that the pet should leave the house.

In some implementations, when the processor determines that the pet has left the home the processor may cause outdoor devices 108 to change their behavior. For example, the processor may send an indication the pet has left the house to the control unit 112 and the control unit 112 may then turn on an outdoor device. Outdoor devices 108 may include invisible fences, exterior lights, outdoor sensors, fence gate locks, and other devices.

The processor may also provide information to users. For example, as the processor may know whenever a pet exits the home through the pet door or enters the home through the pet door, the processor may provide one or more of information reflecting, time spent indoors or outdoors, current location, time last outside, notifications on denied exits or denied entries, and deviations from normal schedule. In some implementations, the door 105 may include one or more of a visible status indicator to indicate to the user if the pet is inside or outside or a visible status indicator to indicate to the pet whether the door 105 is locked or unlocked.

While the processor of the pet door 105 is described as performing various analysis, in some implementations the monitoring server 114 may perform the analysis alone or in combination with the processor of the pet door 105. For example, the pet door 105 may provide the video from the first camera and the second camera to the monitoring server 114 through the control unit 112, the monitoring server 114 may perform the various analysis described above by the processor, and the monitoring server 114 may then provide an instruction back to the control unit 112 that indicates the pet door 105 should open or close.

Figure 2:
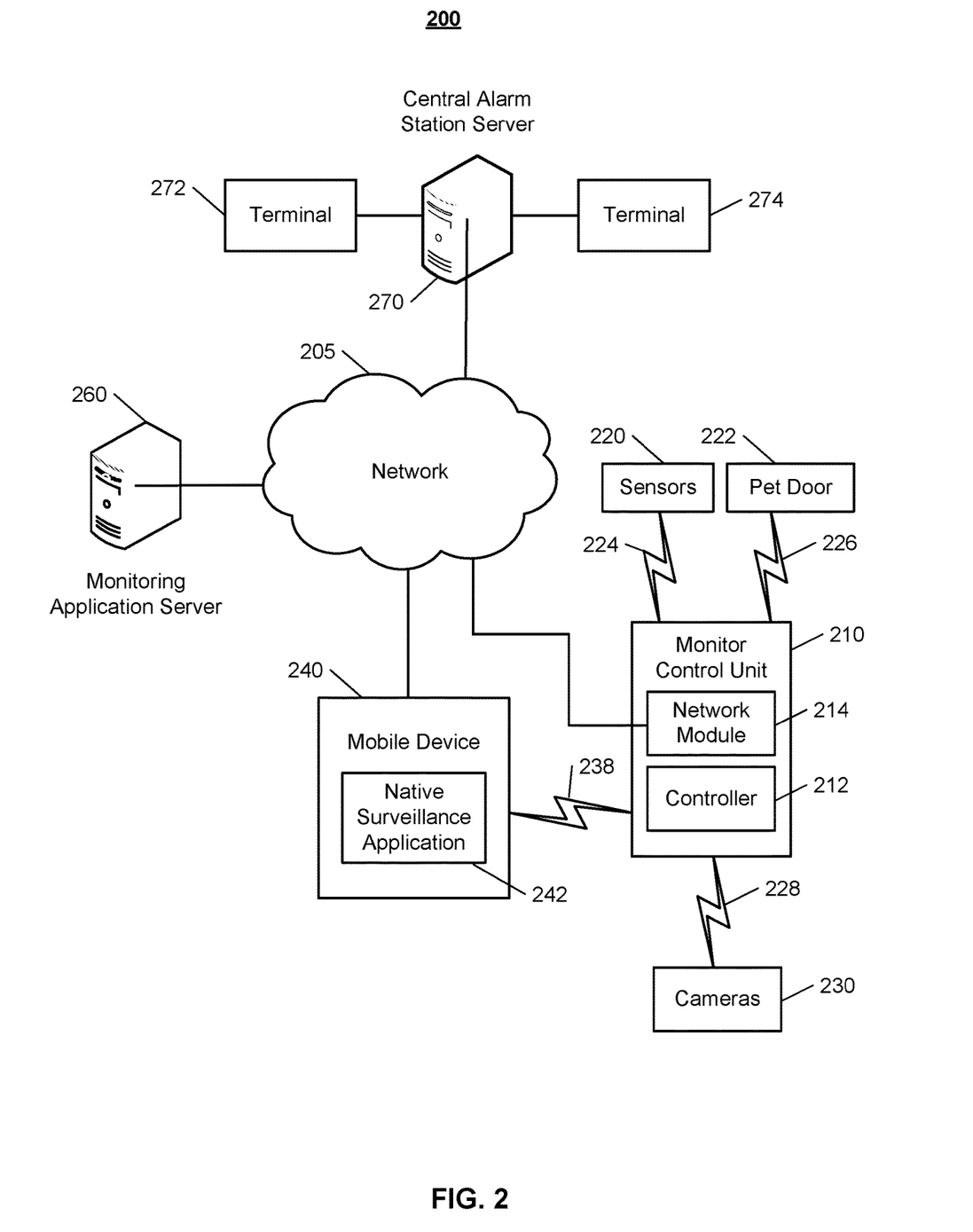
FIG. 2 illustrates another example of a monitoring system with a video analytic enhanced pet door.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system may also include one or more other cameras 230. Each of the one or more cameras 230 may be video/photographic cameras or other type of optical sensing device configured to capture images. For instance, the cameras may be configured to capture images of an area within a building monitored by the monitor control unit 210. The cameras may be configured to capture single, static images of the area and also video images of the area in which multiple images of the area are captured at a relatively high frequency (e.g., thirty images per second). The cameras may be controlled based on commands received from the monitor control unit 210.

The cameras may be triggered by several different types of techniques. For instance, a Passive Infra Red (PIR) motion sensor may be built into the cameras and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The monitoring system may include the pet door 222. The pet door 222 may be similar to the pet door 105 described in FIG. 1 above.

The sensors 220, the pet door 222, and the cameras 230 communicate with the controller 212 over communication links 224, 226, and 228. The communication links 224, 226, and 228 may be a wired or wireless data pathway configured to transmit signals from the sensors 220, the pet door 222, and the cameras 230 to the controller 212. The communication link 224, 226, and 228 may include a local network, such as, 802.11 "Wi-Fi" wireless Ethernet (e.g., using low-power Wi-Fi chipsets), Z-Wave, Zigbee, Bluetooth, "Home-Plug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a monitoring application 242. The monitoring application 242 refers to a software/firmware program running on the corresponding mobile device that enables the user interface and features described throughout. The user device 240 may load or install the monitoring application 242 based on data received over a network or data received from local media. The monitoring application 242 runs on mobile devices platforms, such as iPhone, iPod touch, Blackberry, Google Android, Windows Mobile, etc. The monitoring application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication. Other arrangements and distribution of processing is possible and contemplated within the present disclosure.

Figure 3:
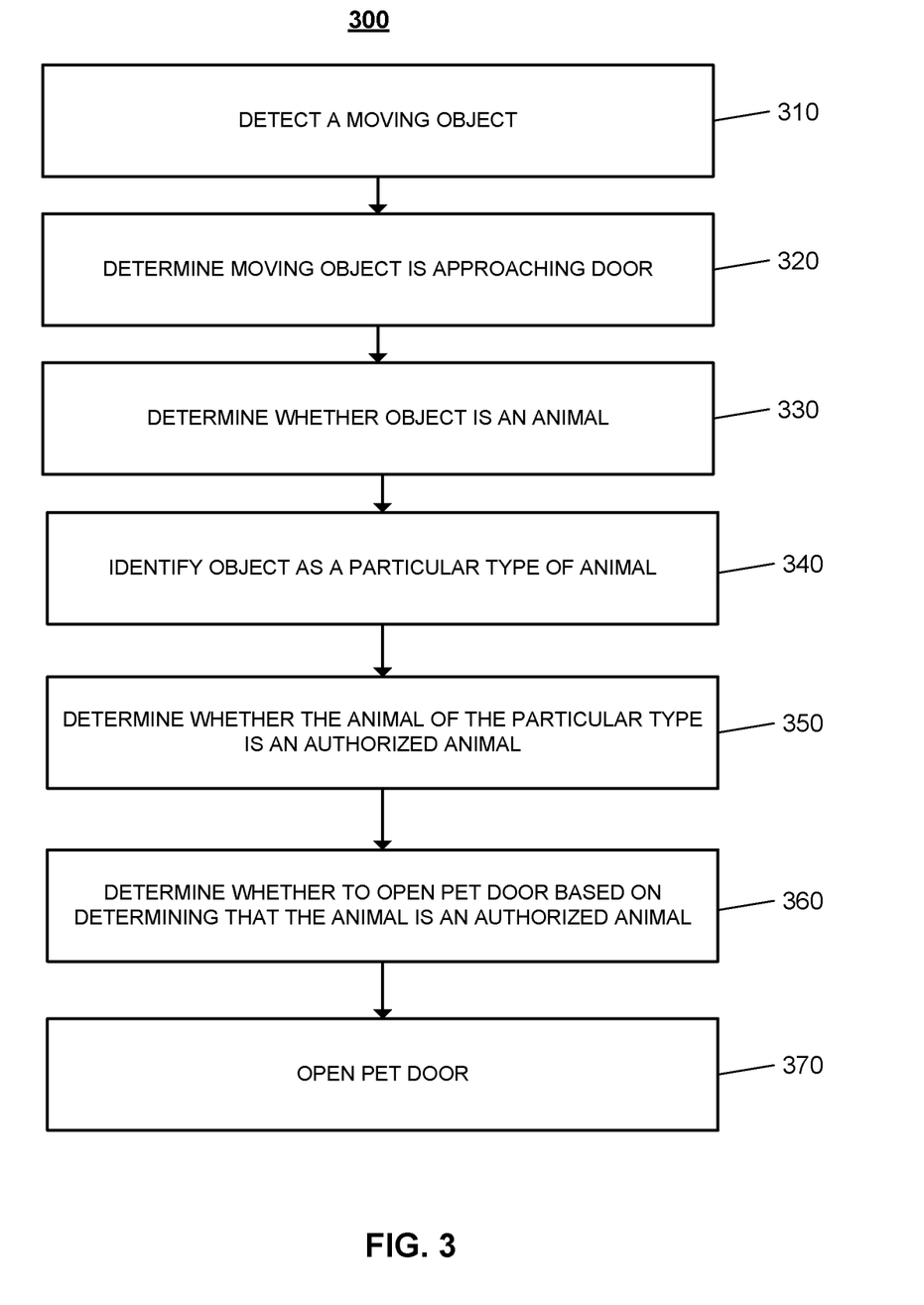
FIG. 3 is a flow chart of an example process for opening a video analytic enhanced pet door.

FIG. 3 illustrates an example process 300 for opening a video analytic enhanced pet door. Process 300 can be implemented using system 100 described above. Thus, descriptions of process 300 may reference one or more of the above-mentioned components, modules, or computational devices of system 100. In some implementations, described actions of process 300 are enabled by computing logic or software instructions executable by a processor and memory of an example electronic device.

The process 300 includes detecting a moving object (310). For example, the processor of the pet door 105 may obtain a stream of images from a camera included in the pet door 105 and facing the outside of the home and detect that a shape is moving or changing in the images.

The process 300 includes determining the moving object is approaching the pet door 105 (320). For example, the processor of the pet door 105 may determine that the shape in the images that is detected to be a moving object is increasing in size and, in response, determine that the moving object is approaching the door.

The process 300 includes determining whether the object is an animal (330). For example, the processor may use a classifier to classify whether the object that is approaching the pet door 105 has a shape and movement pattern that appears to be that of an animal.

The process 300 includes identifying the object as a particular type of animal (340). For example, the processor may use a classify to classify the animal as a particular species of animal.

The process 300 includes determining whether the animal of the particular type is an authorized animal (350). For example, the processor may determine whether the animal that is classified as a dog visually matches a dog that is known to live in the home and thus authorized to use the pet door 105.

The process includes determining whether to open the pet door 105 based on determining that the animal is an authorized animal (360). For example, the processor may determine that the dog approaching the pet door 105 is an authorized animal and, in response, open the pet door 105. As described above, the processor may also consider other factors in determining whether to open the pet door 105. For example, the processor may determine whether there are other animals or humans near the authorized animal or the pet door 105, determine whether the pet door 105 is in a supervised mode and a user should be provided a video stream and provide a confirmation to open the pet door 105, etc.

Figure 4:
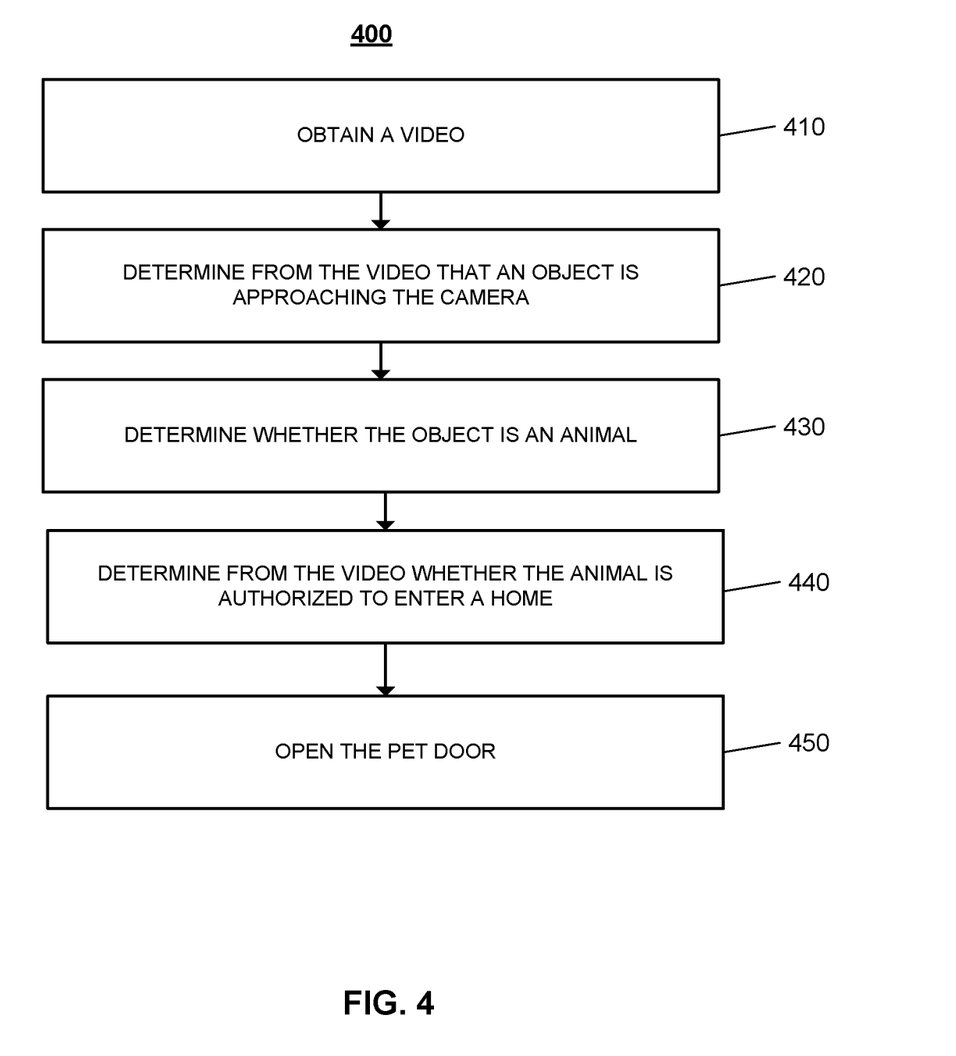
FIG. 4 is a flow chart of another example process for opening a video analytic enhanced pet door.

FIG. 4 illustrates another example process 400 for opening a video analytic enhanced pet door 105. Process 400 can be implemented using system 100 described above. Thus, descriptions of process 400 may reference one or more of the above-mentioned components, modules, or computational devices of system 100. In some implementations, described actions of process 400 are enabled by computing logic or software instructions executable by a processor and memory of an example electronic device. The process 400 includes obtaining a video (410), determining from the video that an object is approaching the camera (420), in response to determining from the video that an object is approaching the camera, determining whether the object is an animal (430), in response to determining that the object is an animal, determining from the video whether the animal is authorized to enter a home (440), and in response to determining from the video that the animal is authorized to enter the home, opening a pet door (450).

For example, the processor of the pet door 105 may (i) obtain video that is formed of a stream of images from a camera included in the pet door 105 and facing the outside of the home of an authorized pet approaching the pet door 105, (ii) determine from the video of the authorized pet approaching the pet door 105 that an object is approaching the pet door 105, (iii) in response to determining that the object is approaching the pet door 105, determine that the object is an animal, (iv) in response to determining that the object is an animal, determine from the video that the pet is the authorized pet, and (v) in response to determining from the video that the pet is the authorized pet, open the pet door.

In some implementations, determining from the video that an object is approaching the camera includes determining that a shape of the object in the video is increasing in size. For example, the processor of the pet door 105 may determine that the number of pixels that form the object in the video has increased from a size of twenty pixels to a size of sixty pixels. In some implementations, the processor of the pet door 105 may use tracking algorithms to follow and object to determine whether the object is approaching the pet door 105. For example, a tracking algorithm may use a centroid on the object from one frame to the next and calculate the velocity vector, e.g., speed and direction, in pixel space. If that vector points toward the pet door 105 over several frames, the processor of the pet door 105 may determine that the object is approaching and when close enough, e.g., from a combination of size and location within the pixel space, can open the pet door 105.

In some implementations, determining whether the object is an animal includes providing the video from the camera to a classifier that is trained to detect whether images include an animal. For example, the processor of the pet door 105 may provide the video to a light weight classifier that only classifies whether an object is an animal or not an animal.

In some implementations, determining from the video whether the animal is authorized to enter a home includes determining from the video that the object is a particular type of animal and, in response to determining from the video that the object is the particular type of animal, determining whether the animal of the particular type of animal is authorized to enter the home. For example, the processor of the pet door 105 may determine that an object classified as an animal by a light weight classifier is a dog and, in response to determining that the animal is a dog, determine whether the dog is a particular dog that has been authorized to enter the home.

In some implementations, determining from the video that the object is the particular type of animal includes providing the video from the camera to a classifier that is trained to classify whether an object is the particular type of animal. For example, the processor of the pet door 105 may provide the video to a medium weight classifier that classifies whether an object is a particular type of animal. The medium weight classifier may classify the object between animal types, e.g., dog, cat, or other.

In some implementations, determining whether the animal of the particular type of animal is authorized to enter the home includes determining whether the animal of the particular type visually matches an appearance of a particular animal that is authorized to enter the home in one or more images of the particular animal that is authorized to enter the home. For example, in response to determining that a dog is approaching the pet door 105, the processor of the pet door 105 may obtain, from a data store, images of dogs authorized to enter a home and determine whether the dog approaching the pet door 105 visually matches an appearance in the stored images of any of the dogs authorized to enter the home. In determining a visual match, the pet door 105 may determine a mathematical representation of features of the authorized animal, where the features may include physical shape of the face and body, movement patterns such as gait, learned behavior such as typical approach route, and markings, e.g., color and pattern of markings).

In some implementations, determining from the video that an object is approaching the camera requires less processing than determining from the video that the object is a particular type of animal, and determining from the video that the object is the particular type of animal requires less processing than determining whether the animal of the particular type visually matches an appearance of a particular animal that is authorized is enter the home in one or more images of the particular animal that is authorized is enter the home. For example, the processor of the pet door 105 may use a light weight classifier for classifying whether an object is approaching, a medium weight classifier that uses more processing than the light weight classifier to classify an object as a particular type of animal, and a heavy weight classifier that uses more processing than the medium weight classifier to classify whether an object matches a visual appearance of animals authorized to enter the home.

In some implementations, opening a pet door 105 includes determining that another animal or person is not present in the video and in response to determining that another animal or person is not present in the video, opening the pet door 105. For example, the processor of the pet door 105 may, in response to determining that an object approaching the pet door 105 is an animal that is authorized to enter the home, determine whether animal is present in the video and only open the pet door 105 if no other animal is in the video. This may prevent other animals from entering the home while the pet door 105 is open for the authorized animal to enter.

In some implementations, opening a pet door 105 includes providing an instruction to an actuator to physically move to open the pet door 105. For example, the processor of the pet door 105 may instruct the actuator to physically move to open the pet door 105 after determining that the object approaching the pet door 105 is an authorized animal, without providing an indication to a user for approval to open the pet door 105 after determining an object is approaching the pet door 105.

In some implementations, opening a pet door 105 includes providing an indication to a user that the particular animal that is authorized to enter the house has approached the pet door 105, receiving an input from the user in response to the indication that indicates to open the pet door 105, and in response to receiving the input from the user in response to the indication that indicates to open the pet door 105, opening the pet door 105. For example, the processor of the pet door 105 may, in response to determining that an object approaching the pet door 105 is an animal that is authorized to enter the home, provide an instruction to the control unit 112 to provide an instruction to the monitoring server 114 to provide a video captured by the pet door 105 to a phone of a user and prompt the user for approval to open the pet door 105. In the example, the monitoring server 114 may then receive a response from the user and if the response approves opening the pet door 105, the monitoring server 114 may provide an instruction to the control unit 112 to instruct the pet door 105 to open without further input from a user after the user provides the response.

In some implementations, determining from the video that an object is approaching the camera may be only after determining that the animal authorized to enter the home is outside the home. For example, the processor of the pet door 105 may track where animals that are authorized to enter the home are and if any such animal is outside (i.e., not all such animals are within the home), disable checking the video from the camera for authorized animals if ano authorized animal may possibly be approaching the pet door 105 from outside the home. Disabling monitoring the video may conserve power usage by the processor of the pet door 105 and reduce the potential for false positive events.

In some implementations, the pet door 105 may further determine whether is it is raining, e.g., from the video from the camera of the pet door 105 or from data indicating weather from the control unit 112 and, if it is raining, prompting a user to permit entry of the authorized animal and if not raining, let the authorized animal in without prompting the user. In another implementation, the pet door 105 may determine from the video from the camera that the camera of the pet door 105 is obscured so that an authorized animal may not be detected and, in response, unlock the pet door 105 while the camera is obscured.

In some implementations, the process may include obtaining video from a second camera, determining that a full length of the animal that is authorized to enter the home is shown in the video from the second camera, and closing the pet door 105. For example, after the pet door 105 opens, the processor of the pet door 105 may obtain video from a second camera in the pet door 105 that faces the inside of the home, determines that the video from the second camera shows the entire tail of the animal, and, in response to seeing the entire tail of the animal is in the video from the second camera, instructs the pet door 105 to close.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining video from a camera;
determining that an object is moving in the video;
based on determining that the object is moving in the video, determining from the video whether the object is approaching a pet door;
based on determining from the video that the object is approaching the pet door, determining from movement pattern shown in the video whether the object approaching the pet door is an animal;
based on determining from movement pattern shown in the video that the object approaching the pet door is an animal, determining from the video whether the animal is of a particular species;
based on determining from the video that the animal is of the particular species, determining from the video whether the animal of the particular species and approaching the pet door is authorized to enter a home;
based on determining from the video that the animal of the particular species and approaching the pet door is authorized to enter the home, opening a pet door;
obtaining video from a second camera;
determining that a tail of the animal that is authorized to enter the home is shown in the video from the second camera; and
based on determining that the tail of the animal that is authorized to enter the home is shown in the video from the second camera, closing the pet door.

2. The method of claim 1, wherein determining from the video that the object is approaching the pet door comprises:
determining that a shape of the object in the video is increasing in size.

3. The method of claim 1, wherein determining from movement pattern shown in the video whether the object approaching the pet door is an animal comprises:
providing the video from the camera to a classifier that is trained to detect whether images include an animal.

4. The method of claim 1, wherein determining from the video whether the animal is of the particular species comprises:
providing the video from the camera to a classifier that is trained to classify whether an object is of the particular species.

5. The method of claim 1, wherein determining from the video whether the animal of the particular species and approaching the pet door is authorized to enter the home comprises:
determining whether the animal visually matches an appearance of a particular animal that is authorized is enter the home in one or more images of the particular animal that is authorized is enter the home.

6. The method of claim 5, wherein determining from the video that the object is approaching the pet door requires less processing than determining from the video that the object is a particular species of animal, and determining from the video that the object is the particular species of animal requires less processing than determining whether the animal visually matches an appearance of a particular animal that is authorized is enter the home in one or more images of the particular animal that is authorized is enter the home.

7. The method of claim 1, wherein opening a pet door comprises:

determining that another animal or person is not present in the video; and in response to determining that another animal or person is not present in the video, opening the pet door.

8. The method of claim 1, wherein opening a pet door comprises:
providing an instruction to an actuator to physically move to open the pet door.

9. The method of claim 1, wherein opening a pet door comprises:
providing an indication to a user that the animal that is authorized to enter the home has approached the pet door;
receiving an input from the user in response to the indication that indicates to open the pet door; and
in response to receiving the input from the user in response to the indication that indicates to open the pet door, opening the pet door.

10. The method of claim 1, comprising:
determining that the animal that is authorized to enter the home is outside the home before determining from the video whether the animal of the particular species and approaching the pet door is authorized to enter the home,
wherein determining from the video whether the animal of the particular species and approaching the pet door is authorized to enter the home is based on tracking that the animal that is authorized to enter the home went outside the home.

11. A system comprising:
one or more computers and one or more storage devices storing instructions that are operable, when executed by the one or more computers, to cause the one or more computers to perform operations comprising:
obtaining video from a camera;
determining that an object is moving in the video;
based on determining that the object is moving in the video, determining from the video whether the object is approaching a pet door;
based on determining from the video that the object is approaching the pet door, determining from movement pattern shown in the video whether the object approaching the pet door is an animal;
based on determining from movement pattern shown in the video that the object approaching the pet door is an animal, determining from the video whether the animal is of a particular species;
based on determining from the video that the animal is of the particular species, determining from the video whether the animal of the particular species and approaching the pet door is authorized to enter a home;
based on determining from the video that the animal of the particular species and approaching the pet door is authorized to enter the home, opening a pet door;
obtaining video from a second camera;
determining that a tail of the animal that is authorized to enter the home is shown in the video from the second camera; and
based on determining that the tail of the animal that is authorized to enter the home is shown in the video from the second camera, closing the pet door.

12. The system of claim 11, wherein determining from the video that the object is approaching the pet door comprises:
determining that a shape of the object in the video is increasing in size.

13. The system of claim 11, wherein determining from movement pattern shown in the video whether the object approaching the pet door is an animal comprises:
providing the video from the camera to a classifier that is trained to detect whether images include an animal.

14. The system of claim 11, wherein determining from the video whether the animal is of the particular species comprises:
providing the video from the camera to a classifier that is trained to classify whether an object is of the particular species.

15. The system of claim 11, wherein determining from the video whether the animal of the particular species and approaching the pet door is authorized to enter the home comprises:
determining whether the animal visually matches an appearance of a particular animal that is authorized is enter the home in one or more images of the particular animal that is authorized is enter the home.

16. The system of claim 15, wherein determining from the video that the object is approaching the pet door requires less processing than determining from the video that the object is a particular species of animal, and determining from the video that the object is the particular species of animal requires less processing than determining whether the animal visually matches an appearance of a particular animal that is authorized is enter the home in one or more images of the particular animal that is authorized is enter the home.

17. A non-transitory computer-readable medium storing software comprising instructions executable by one or more computers which, upon such execution, cause the one or more computers to perform operations comprising:
obtaining video from a camera;
determining that an object is moving in the video;
based on determining that the object is moving in the video, determining from the video whether the object is approaching a pet door;
based on determining from the video that the object is approaching the pet door, determining from movement pattern shown in the video whether the object approaching the pet door is an animal;
based on determining from movement pattern shown in the video that the object approaching the pet door is an animal, determining from the video whether the animal is of a particular species;
based on determining from the video that the animal is of the particular species, determining from the video whether the animal of the particular species and approaching the pet door is authorized to enter a home;
based on determining from the video that the animal of the particular species and approaching the pet door is authorized to enter the home, opening a pet door;
obtaining video from a second camera;
determining that a tail of the animal that is authorized to enter the home is shown in the video from the second camera; and
based on determining that the tail of the animal that is authorized to enter the home is shown in the video from the second camera, closing the pet door.

* * * * *